J. R. BEATTIE.
TURN TABLE.
APPLICATION FILED JUNE 11, 1908.
936,854. Patented Oct. 12, 1909.
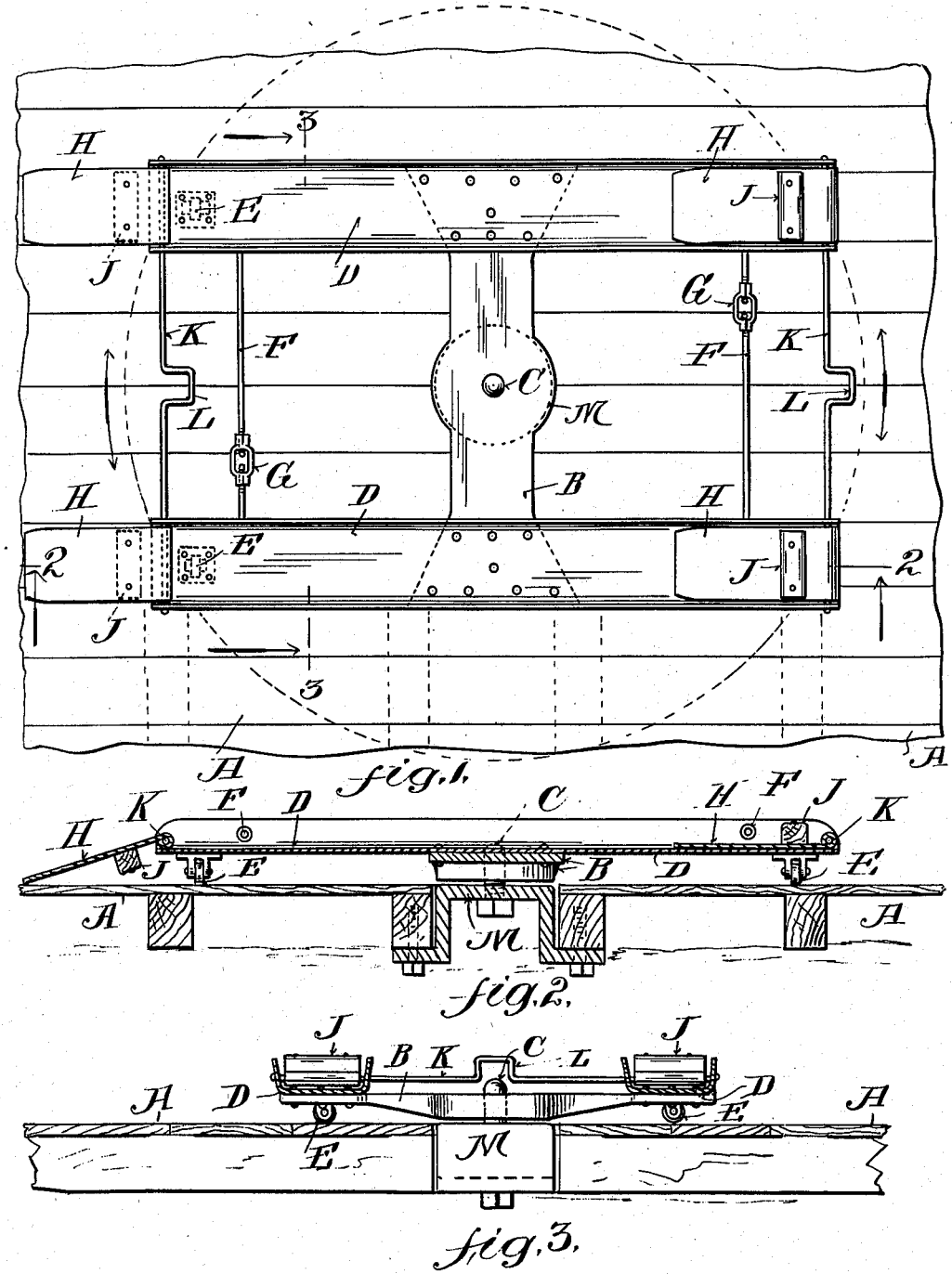

UNITED STATES PATENT OFFICE.

JOHN R. BEATTIE, OF MOUNT VERNON, NEW YORK.

TURN-TABLE.

936,854.  Specification of Letters Patent.  Patented Oct. 12, 1909.

Application filed June 11, 1908. Serial No. 437,834.

*To all whom it may concern:*

Be it known that I, JOHN R. BEATTIE, a citizen of the United States, residing at Mount Vernon, county of Westchester, State of New York, have made a certain new and useful Invention in Turn-Tables, of which the following is a specification.

The invention relates to turn tables, and particularly to the class of turn tables employed in connection with automobile garages, stables or the like.

The object of the invention is to provide a construction of turn table for automobile garages, which is simple in construction and efficient in operation.

The invention consists substantially in the construction, combination, location and relative arrangement of parts, all as will be more fully hereinafter set forth, as shown in the accompanying drawing, and finally pointed out in the appended claims.

Referring to the accompanying drawing, and to the various views and reference signs appearing thereon: Figure 1 is a view in plan of a turn table embodying the principles of my invention. Fig. 2 is a view in section on the line 2, 2, Fig. 1, looking in the direction of the arrows. Fig. 3 is a transverse section on the line 3, 3, Fig. 1, looking in the direction of the arrows.

The same part is designated by the same reference sign wherever it occurs throughout the several views.

In the drawings reference sign A, designates the floor of an automobile garage, storeroom or the like.

B, designates a supporting plate provided with a central opening therethrough to receive a pivot pin C, upon which said supporting beam may freely rock or turn. Suitably mounted upon the ends of the supporting beam B, are the track rails D. Preferably, and in order to secure strength these track rails are channel shaped, and each has secured to the outer ends thereof, suitable rollers or casters E, adapted to turn and operate over the surface of the floor A, thereby facilitating the swinging movements of the turn table, and at the same time affording supports for the ends of the track rails. Each end of each rail is connected to the corresponding end of the other rail by means of an adjusting rod F, whereby the track rails may be braced at their ends and the spacing apart of the track rails may be slightly varied. A simple arrangement is shown as an embodiment of the principles of my invention, wherein turn buckles G are employed in the connections F, whereby the desired adjustment and tension may be accomplished.

Pivotally mounted upon each end of each track rail D, is an approach plate or member H. By rocking or swinging these approach plate members into proper position, as indicated at the left hand ends of the track rails, as shown in Figs. 1 and 2, means are afforded for guiding the approach of the automobile wheels to and upon the track rails D. Upon the under side of each approach member H, when such member is in position to form an approach to its track rails, is a block J, adapted when the approach member is folded over upon the track rail to form a buffer or stop block to prevent the automobile wheels from riding therefrom, thereby serving as stops for the automobile. It is obvious that these stop devices may be arranged in many other specifically different ways.

In practice the approach members have one end of each of the track rails folded over upon the said rails, while those at the other end of the track rails are in position for use as approach or guiding plates for the automobile wheels to ride over in passing from the floor to the track rails. The approach members H, may be rocked or swung in any suitable or convenient manner. In practice, however, it is desirable to simultaneously swing or fold the plates H, which are located at corresponding ends of the track rails. To this end, and in the specific form shown, to which, however, the invention is not to be limited or restricted, a pivot rod K, is connected at its ends to the approach members H, which are located at the corresponding ends of the track rails. As a convenient arrangement hand crank L, is shown, by means of which the approach members H, may be rocked or swung into and out of position for use as approaches or stops.

The pivot pin C, upon which the whole structure or turn table is rocked or swung, may be supported in many specifically different ways, preferably in the center or other convenient location in the floor of the garage. A simple arrangement is shown wherein said pivot pin is carried by a supporting strut M, arranged in the floor space of the garage, and preferably in the opening in such floor space.

From the foregoing description it will be seen that I provide an efficient turn table for use in automobile garages, and whereby the provision of special approaches to the turn table is avoided as an automobile may be run onto the turn table by any desired line of movement, since the turn table may be turned in any direction and is ready to receive the automobile thereon from any direction. It is also seen that provision is made for efficiently supporting the track rails and the weight of the automobile thereon, and without interfering with the free rotary movement of the table. It will also be seen that provision is made for preventing the automobile from overrunning the table. The track rails, being in the form of channels may be of sufficient width to well accommodate various sizes of tires, while at the same time, the channel form rails add strength and rigidity thereto.

Having now set forth the object and nature of my invention, and a construction embodying the principles thereof, and having described such construction, its purpose, function and mode of operation, what I claim as new and useful, and of my own invention, and desire to secure by Letters Patent of the United States is:—

1. In a turn table, a pivotally mounted supporting beam, and channeled track rails carried by the ends of said supporting beam and having roller supports for their free ends, said track rails adapted to receive the wheels of an automobile to form a turn table therefor.

2. In a turn table, a supporting beam pivotally mounted at its center, channeled track rails supported intermediate their ends by the ends of said supporting beam, and roller supports for the free ends of said track rails.

3. In a turn table, a supporting beam, channeled track rails carried by the ends thereof, and having supports for their free ends, and means connecting together the corresponding ends of said rails to brace the same.

4. In a turn table, a pivotally mounted supporting beam, track rails carried by the ends of said beam, and adjustable connections between the corresponding ends of said rails.

5. In a turn table, a supporting beam, a pivot stud on which said supporting beam is mounted to rock or swing, track rails carried by the ends of said supporting beam, connections between corresponding ends of said rails to brace the same together, and means for adjusting said connections.

6. In a turn table, a pivotally mounted supporting beam, track rails carried thereby, and approach members pivotally mounted upon said rails, on the ends thereof and having stop blocks arranged to form stops when said members are swung out of position for use as approach members.

7. In a turn table, a pivotally mounted supporting beam, track rails carried thereby, and movable stop blocks carried by said rails at the ends thereof.

8. In a turn table, a pivotally mounted supporting beam, track rails carried thereby, approach members pivotally mounted upon the ends of said rails, means for simultaneously rocking and swinging said approach members at corresponding ends of said rails and stop blocks carried by said approach members.

9. In a turn table, a pivotally mounted supporting beam, track rails carried thereby, approach members pivotally mounted upon said rails at the ends thereof, and stop blocks carried by said approach members.

In testimony whereof I have hereunto set my hand in the presence of the subscribing witnesses, on this 4th day of June A. D., 1908.

JOHN R. BEATTIE.

Witnesses:
JOSEPH KLEIN,
S. E. DARBY.